(12) United States Patent
Chin

(10) Patent No.: US 8,064,526 B2
(45) Date of Patent: Nov. 22, 2011

(54) SYSTEMS, METHODS, AND APPARATUS FOR REAL-TIME ENCODING

(75) Inventor: Douglas Chin, Haverhill, MA (US)

(73) Assignee: Broadcom Corporation, Irvine, CA (US)

( * ) Notice: Subject to any disclaimer, the term of this patent is extended or adjusted under 35 U.S.C. 154(b) by 1591 days.

(21) Appl. No.: 11/412,269

(22) Filed: Apr. 27, 2006

(65) Prior Publication Data

US 2006/0256859 A1    Nov. 16, 2006

Related U.S. Application Data

(60) Provisional application No. 60/681,268, filed on May 16, 2005.

(51) Int. Cl.
*H04N 7/18*    (2006.01)

(52) U.S. Cl. .................................. 375/240.26; 348/721

(58) Field of Classification Search ............ 375/240.01–375/240.29; 348/715–721
See application file for complete search history.

(56) References Cited

U.S. PATENT DOCUMENTS 5,986,712 A * 11/1999 Peterson et al. ......... 375/240.14
6,317,819 B1 * 11/2001 Morton ........................... 712/22

* cited by examiner

*Primary Examiner* — Andy Rao
(74) *Attorney, Agent, or Firm* — McAndrews, Held & Malloy, Ltd.

(57) ABSTRACT

Presented herein are systems, methods, and apparatus for real-time high definition television encoding. In one embodiment, there is a method for encoding video data. The method comprises estimating amounts of data for encoding a plurality of pictures in parallel; generating a plurality of target rates corresponding to the plurality of pictures based on the estimated amounts of data for encoding the plurality of pictures; and lossy compressing the plurality of pictures based on the target rates corresponding to the plurality of pictures.

16 Claims, 7 Drawing Sheets

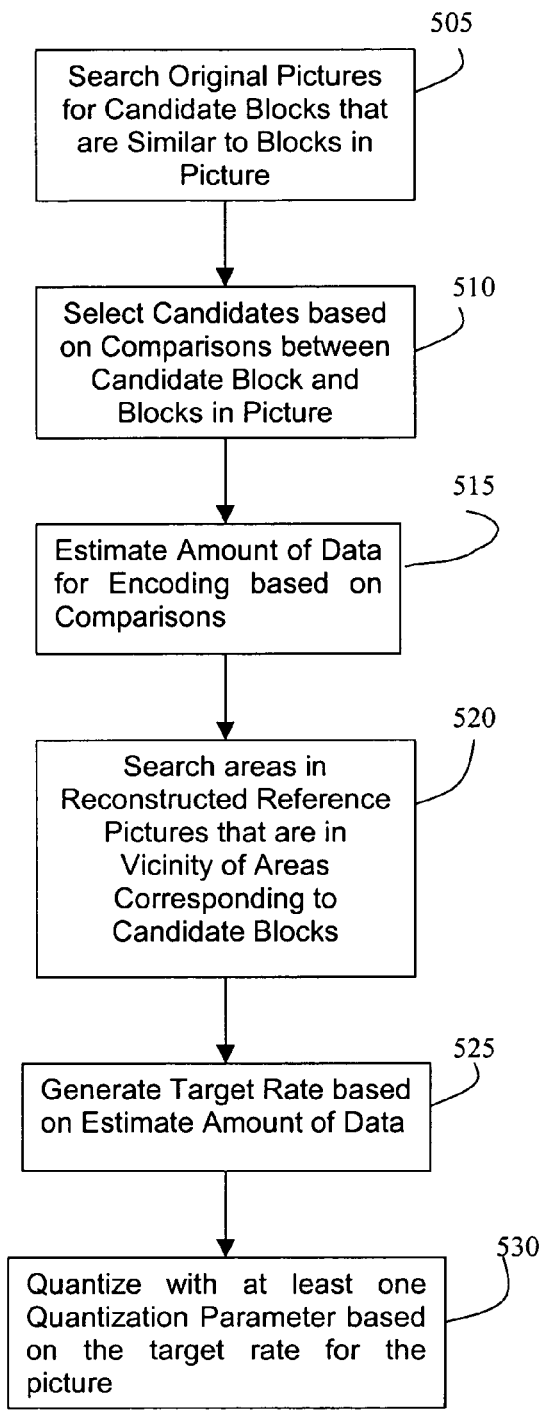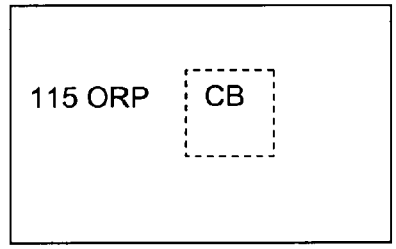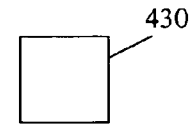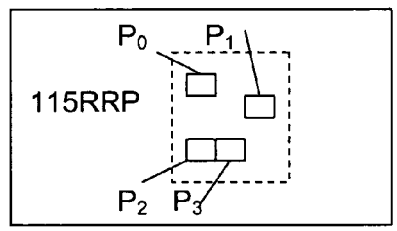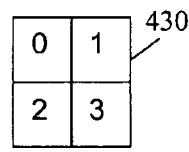
FIGURE 5
FIGURE 6

SYSTEMS, METHODS, AND APPARATUS FOR REAL-TIME ENCODING

RELATED APPLICATIONS

This application claims priority to "Systems, Methods, and Apparatus for Real-Time High Definition Encoding", U.S. Provisional Application for Patent, Ser. No. 60/681,268, filed May 16, 2005.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Advanced Video Coding (AVC) (also referred to as H.264 and MPEG-4, Part 10) can be used to compress video content for transmission and storage, thereby saving bandwidth and memory. However, encoding in accordance with AVC can be computationally intense.

In certain applications, for example, live broadcasts, it is desirable to compress high definition television content in accordance with AVC in real time. However, the computationally intense nature of AVC operations in real time may exhaust the processing capabilities of certain processors. Parallel processing may be used to achieve real time AVC encoding, where the AVC operations are divided and distributed to multiple instances of hardware which perform the distributed AVC operations, simultaneously.

Ideally, the throughput can be multiplied by the number of instances of the hardware. However, in cases where a first operation is dependent on the results of a second operation, the first operation may not be executable simultaneously with the second operation. In contrast, the performance of the first operation may have to wait for completion of the second operation.

AVC uses temporal coding to compress video data. Temporal coding divides a picture into blocks and encodes the blocks using similar blocks from other pictures, known as reference pictures. To achieve the foregoing, the encoder searches the reference picture for a similar block. This is known as motion estimation. At the decoder, the block is reconstructed from the reference picture. However, the decoder uses a reconstructed reference picture. The reconstructed reference picture is different, albeit imperceptibly, from the original reference picture. Therefore, the encoder uses encoded and reconstructed reference pictures for motion estimation.

Using encoded and reconstructed reference pictures for motion estimation causes encoding of a picture to be dependent on the encoding of the reference pictures. This is can be disadvantageous for parallel processing.

Additional limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Presented herein are systems, methods, and apparatus for encoding video data in real time, as shown in and/or described in connection with at least one of the figures, as set forth more completely in the claims.

These and other advantages and novel features of the present invention, as well as illustrated embodiments thereof will be more fully understood from the following description and drawings.

BRIEF DESCRIPTION OF SEVERAL VIEWS OF THE DRAWINGS

FIG. 5 is a flow diagram for encoding video data in accordance with an embodiment of the present invention;

FIG. 6 is a block diagram describing the estimation of data for encoding pictures;

DETAILED DESCRIPTION OF THE INVENTION

Figure 1:
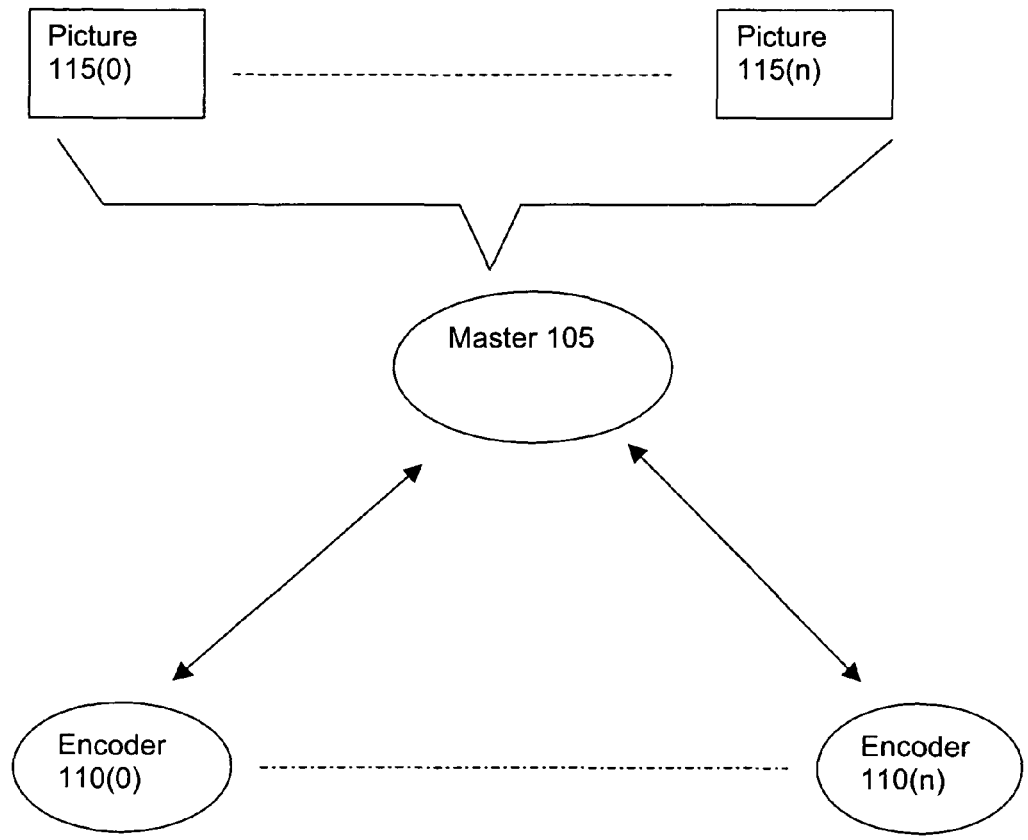
FIG. 1 is a block diagram of an exemplary system for encoding video data in accordance with an embodiment of the present invention.

Referring now to FIG. 1, there is illustrated a block diagram of an exemplary system for encoding video data in accordance with an embodiment of the present invention. The video data comprises a plurality of pictures 115(0) ... 115(x). The system comprises a plurality of encoders 110(0) ... 110(n). The plurality of encoders 110(0) ... 110(n) estimate amounts of data for encoding a corresponding plurality of pictures 115(0) ... 115(n), in parallel. A master 105 generates a plurality of target rates corresponding to the pictures and the encoders. The encoders 110(0) ... 110(n) lossy compress the pictures based on the corresponding target rates.

The master 105 can receive the video data for compression. Where the master 105 receives the video data for compression, the master 105 can divide the video data among the encoders 110(0) ... 110(n), provide the divided portions of the video data to the different encoders, and play a role in controlling the rate of compression.

In certain embodiments, the compressed pictures are returned to the master 105. The master 105 collates the compressed pictures, and either writes the compressed video data to a memory (such as a disc drive) or transmits the compressed video data over a communication channel.

The master 105 plays a role in controlling the rate of compression by each of the encoders 110(0) ... 110(n). Compression standards, such as AVC, MPEG-2, and VC-1 use both lossless and lossy compression to encode video data 102. In lossless compression, information from the video data is not lost from the compression. However, in lossy compression, some information from the video data is lost to improve compression. An example of lossy compression is the quantization of transform coefficients.

Lossy compression involves trade-off between quality and compression. Generally, the more information that is lost during lossy compression, the better the compression rate, but, the more the likelihood that the information loss perceptually changes the video data and reduces quality.

The encoders 110 perform a pre-encoding estimation of the amount of data for encoding pictures 115. For example, the encoders 110 can estimate the amount of data for encoding a picture 115, by estimating the amount of data for encoding the picture 115 with a given quantization parameter.

Based on the estimate of the amount of data for encoding the picture 115, the master 105 can provide a target rate to the encoders 110 for compressing the picture 115. The encoders 110(0) . . . 110(n) can adjust certain parameters that control lossy compression to achieve an encoding rate that is close, if not equal, to the target rate.

The estimate of the amount of data for encoding a picture 115 can be based on a variety of factors. These qualities can include, for example, content sensitivity, measures of complexity of the pictures and/or the blocks therein, and the similarity of blocks in the pictures to candidate blocks in reference pictures. Content sensitivity measures the likelihood that information loss is perceivable, based on the content of the video data. For example, in video data, human faces are likely to be more closely examined than animal faces.

In certain embodiments of the present invention, the master 105 can also collect statistics of past target rates and actual rates under certain circumstances. This information can be used as feedback to bias future target rates. For example, where the actual target rates have been consistently exceeded by the actual rates in the past under a certain circumstance, the target rate can be reduced in the future under the same circumstances.

Figure 2:
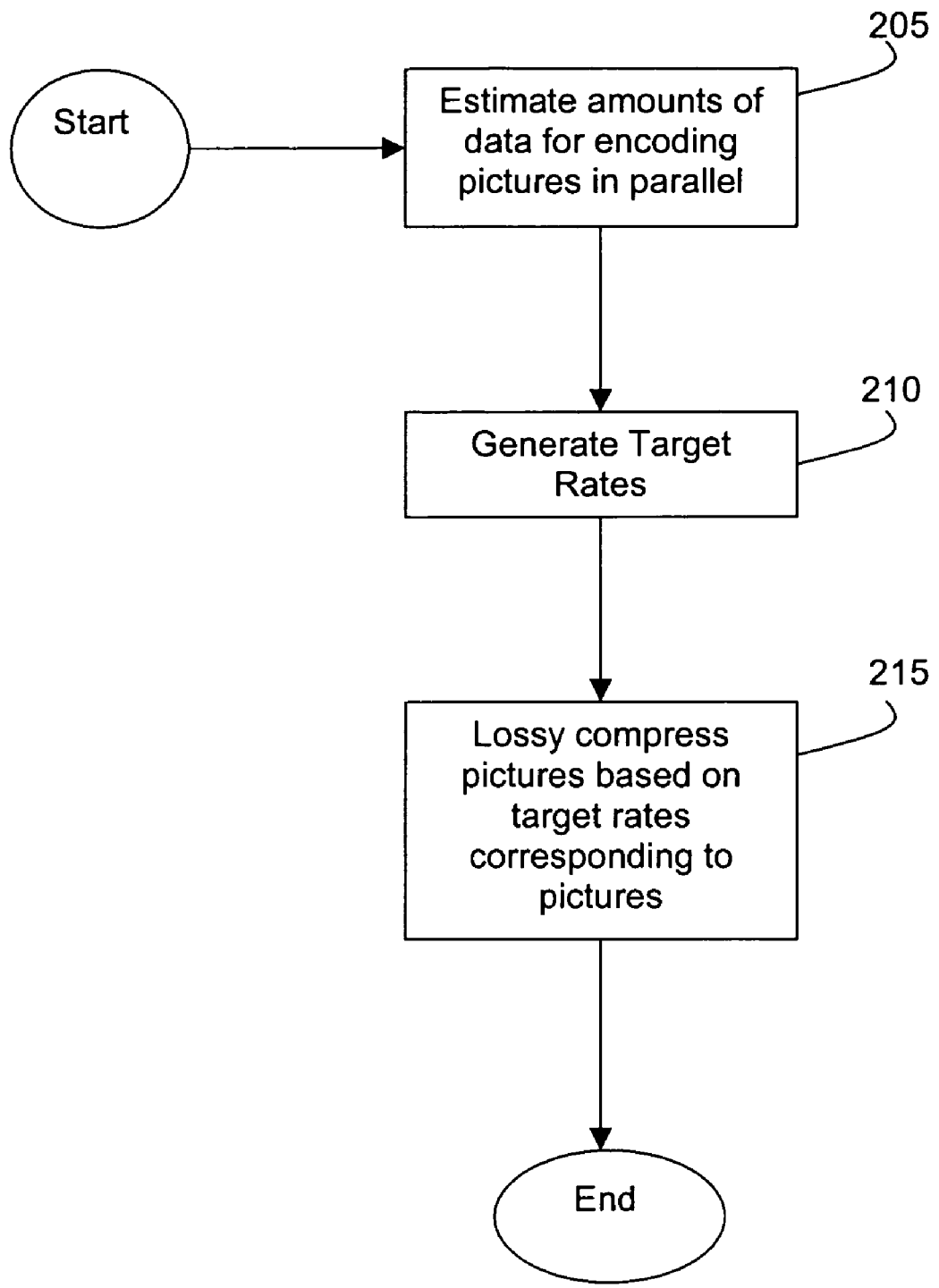
FIG. 2 is a flow diagram for encoding video data in accordance with an embodiment of the present invention.

Referring now to FIG. 2, there is illustrated a flow diagram for encoding video data in accordance with an embodiment of the present invention. At 205, the encoders 110(0) . . . 110(n) each estimate the amounts of data for encoding pictures 115(0) . . . 115(n) in parallel.

At 210, the master 105 generates target rates for each of the pictures 115(0) . . . 115(n) based on the estimated amounts during 205. At 215, the encoders 110(0) . . . 110(n) lossy compress the pictures 115(0) . . . 115(n) based on the target rates corresponding to the plurality of pictures.

Embodiments of the present invention will now be presented in the context of an exemplary video encoding standard, Advanced Video Coding (AVC) (also known as MPEG-4, Part 10, and H.264). A brief description of AVC will be presented, followed by embodiments of the present invention in the context of AVC. It is noted, however, that the present invention is by no means limited to AVC and can be applied in the context of a variety of the encoding standards.

Advanced Video Coding

Advanced Video Coding (also known as H.264 and MPEG-4, Part 10) generally provides for the compression of video data by dividing video pictures into fixed size blocks, known as macroblocks. The macroblocks can then be further divided into smaller partitions with varying dimensions.

The partitions can then be encoded, by selecting a method of prediction and then encoding what is known as a prediction error. AVC provides two types of predictors, temporal and spatial. The temporal prediction uses a motion vector to identify a same size block in another picture and the spatial predictor generates a prediction using one of a number of algorithms that transform surrounding pixel values into a prediction. Note that the data coded includes the information needed to specify the type of prediction, for example, which reference frame, partition size, spatial prediction mode etc.

The reference pixels can either comprise pixels from the same picture or a different picture. Where the reference block is from the same picture, the partition is spatially predicted. Where the reference block is from another picture, the partition is temporally predicted.

Spatial Prediction

Figure 3A:
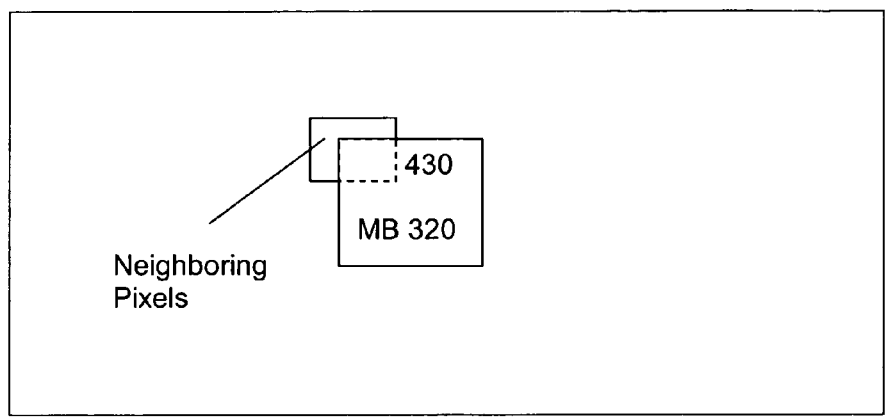
FIG. 3A is a block diagram describing spatially predicted macroblocks.
Figure 3A:
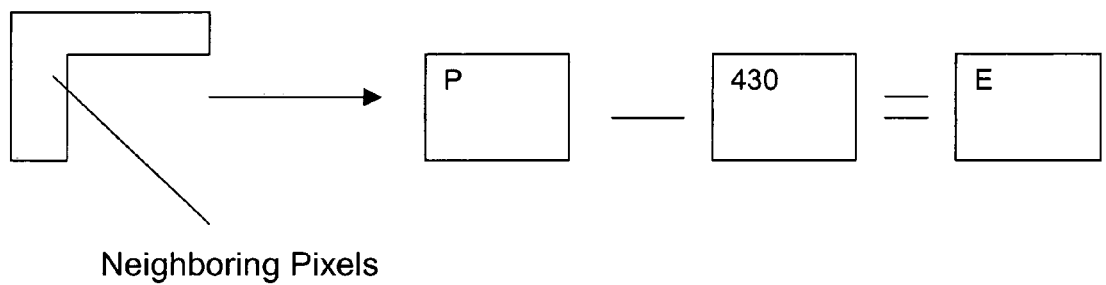

Referring now to FIG. 3A, there is illustrated a block diagram describing spatially encoded macroblocks 320. Spatial prediction, also referred to as intra prediction, is used by H.264 and involves prediction of pixels from neighboring pixels. Prediction pixels are generated from the neighboring pixels in any one of a variety of ways.

The difference between the actual pixels of the partition 430 and the prediction pixels P generated from the neighboring pixels is known as the prediction error E. The prediction error E is calculated and encoded.

Temporal Prediction

Figure 3B:
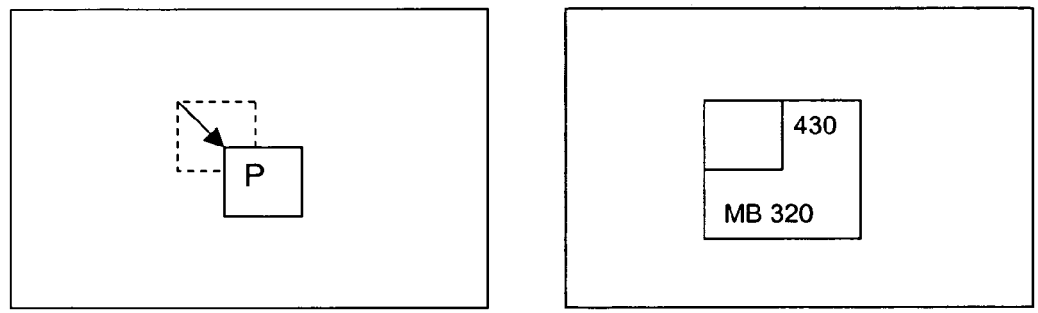
FIG. 3B is a block diagram describing temporally predicted macroblocks.
Figure 3B:
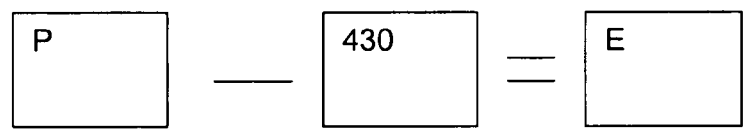

Referring now to FIG. 3B, there is illustrated a block diagram describing temporally prediction. With temporal prediction, partitions 430 are predicted by finding a partition of the same size and shape in a previously encoded reference frame. Additionally, the predicted pixels can be interpolated from pixels in the frame or field, with as much as ¼ pixel resolution in each direction. A macroblock 320 is encoded as the combination of data that specifies the derivation of the reference pixels P and the prediction errors E representing its partitions 430. The process of searching for the similar block of predicted pixels P in pictures is known as motion estimation.

The similar block of pixels is known as the predicted block P. The difference between the block 430 and the predicted block P is known as the prediction error E. The prediction error E is calculated and encoded, along with an identification of the predicted block P. The predicted blocks P are identified by motion vectors MV and the reference frame they came from. Motion vectors MV describe the spatial displacement between the block 430 and the predicted block P.

Transformation, Quantization, and Scanning

Figure 4:
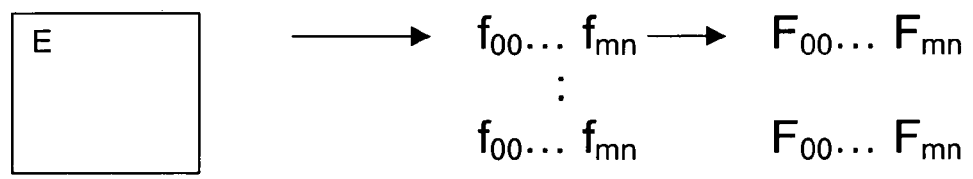
FIG. 4 is a block diagram describing the encoding of a prediction error.

Referring now to FIG. 4, there is illustrated a block diagram describing the encoding of the prediction error E. With both spatial prediction and temporal prediction, the macroblock 320 is represented by a prediction error E. The prediction error E is a two-dimensional grid of pixel values for the luma Y, chroma red Cr, and chroma blue Cb components with the same dimensions as the macroblock 320, like the macroblock.

A transformation transforms the prediction errors E 430 to the frequency domain. In H.264, the blocks can be 4×4, or 8×8. The foregoing results in sets of frequency coefficients $f_{00} \ldots f_{mn}$, with the same dimensions as the block. The sets of frequency coefficients are then quantized, resulting in sets of quantized frequency coefficients, $F_{00} \ldots F_{mn}$.

Quantization is a lossy compression technique where the amount of information that is lost depends on the quantization parameters. The information loss is a tradeoff for greater compression. In general, the greater the information loss, the greater the compression, but, also, the greater the likelihood of perceptual differences between the encoded video data, and the original video data.

The pictures 115 are encoded as the portions 120 forming them. The video sequence is encoded as the frames forming it. The encoded video sequence is known as a video elementary stream. Transmission of the video elementary stream instead of the original video consumes substantially less bandwidth.

Due to the lossy compression, the quantization of the frequency components, there is a loss of information between the encoded and decoded (reconstructed) pictures 115 and the original pictures 115 of the video data. Ideally, the loss of information does not result in perceptual differences. As noted above, both spatially and temporally encoded pictures are predicted from predicted blocks P of pixels. When the spatially and temporally encoded pictures are decoded and reconstructed, the decoder uses blocks of reconstructed pixels P from reconstructed pictures. Predicting from predicted blocks of pixels P in original pictures can result in accumulation of information loss between both the reference picture 115 and the picture 115 to be predicted. Accordingly, during spatial and temporal encoding, the encoder uses predicted blocks P of pixels from reconstructed pictures 115.

Motion estimating entirely from reconstructed pictures 115 creates data dependencies between the compression of the predicted picture 115 and the predicted picture 115. This is particularly disadvantageous because exhaustive motion estimation is very computationally intense.

According to certain aspects of the present invention, the process of estimating the amount of data for encoding the pictures 115 can be used to assist and reduce the amount of time for compression of the pictures. This is especially beneficial because the estimations are performed in parallel.

Referring now to FIG. 5, there is illustrated a flow diagram for estimating the amount of data for encoding pictures in accordance with an embodiment of the present invention, when temporal prediction is used. The foregoing can be used in conjunction with spatially prediction from original pictures, such as that described in Provisional Application Ser. No. 60/681,642 by Chin, filed May 16, 2005.

The flow diagram will be described in conjunction with FIG. 6. The amount of data for encoding pictures is estimated in parallel during 505-515, the motion estimation is performed during 520, and the pictures are encoded during 525-530.

At 505 original reference pictures 115ORP are searched for candidate blocks CB that are similar to blocks 430 in the pictures. The original reference pictures 115ORP includes pictures 115, frames, top fields, bottom fields, or portions of the foregoing, from the video data received by the master 105, frames, top fields, bottom fields, or portions of the foregoing, from the video data 102, where the compression is data independent from the compression of other pictures 115, frames, top fields, bottom fields, or portions of the foregoing. This can include, but is not limited to, scaled down versions of the pictures 115, frames, top field, bottom, or portions thereof, from the video data 102.

The blocks 430 can be any two-dimensional structure of pixels from a picture 115, wherein each dimension is at least 2 pixels. The blocks 430 can also include a collection of blocks 430, such as a macroblock 320. The blocks 430 can also include pixels that are taken from a scaled down version of a picture 120.

Searching a scaled down original reference picture 115ORP with a block 430 from a scaled down picture 115 can significantly reduce the time for the search for candidate blocks CB. Additionally, the time can be further reduced by using larger blocks 430.

At 510, candidate blocks are selected based on a comparison between the candidate blocks CB and the blocks 430 in the pictures 115. The degree of similarity between the candidate blocks CB and the blocks 430 can be measured in a variety of ways, such as the sum of absolute differences and the sum of absolute transformed differences. The blocks with the greatest similarity can be selected as the candidate blocks CB.

In a reconstructed reference pictures 115RRP, the areas in the vicinity of areas corresponding to the candidate blocks CB in the original reference pictures 115ORP are likely to provide suitable reference blocks P. Additionally, the comparison between the candidate block CB and the blocks 430 are likely to be indicative of the prediction error. Thus from the comparison between the candidate blocks CB in the original reference pictures 115 and the blocks 430 in the picture 115, an estimate can be made of the amount of data for encoding the picture 115. Accordingly, at 515, the amount of data for encoding the pictures is estimated based on the comparisons between the candidate blocks in the original reference pictures 115ORP and the blocks 430 in the picture 115.

Because original reference pictures 115ORP are used, in contrast to reconstructed reference pictures 115RRP, 505-515 can be performed for separate pictures in parallel. Additionally, the candidate block CB information can be used for motion estimation.

At 520, the areas in reconstructed reference pictures 115RRP that are in the vicinity of the areas corresponding to the candidate blocks in the original reference picture 115ORP can be searched for reference blocks P for the blocks 430 in the picture 115. Additionally areas in the reconstructed reference picture 115RRP can also be searched. Additional areas can also be searched based on candidate blocks for neighboring blocks 430. For example, the areas can be similarly displaced from the block 430 to displacement between the candidate block CB for a neighboring block 430 and the neighboring block 430.

The search for the reference blocks P can differ from 505 in a number of ways. For example, reconstructed reference picture 115RRP and the picture 115 can be full scale, whereas during 505, the original reference picture 115ORP and the picture 115 can be reduced scale. Additionally, the blocks 430 can be smaller partitions of the blocks used in 505. For example, during 505, a 16×16 block can be used, while during 520, the 16×16 block can be divided into smaller blocks, such as 8×8 blocks 430(0) . . . 430(3), or 4×4 blocks. Also, the reconstructed reference picture 115RRP can be searched with ¼ pixel resolution.

At 525, the target rate is generated for each picture 115, based on the estimated amount of data for encoding the picture during 515. At 530, the pictures 115 are quantized using quantization parameters that are based on the target rate for the pictures provided during 525.

Figure 7:
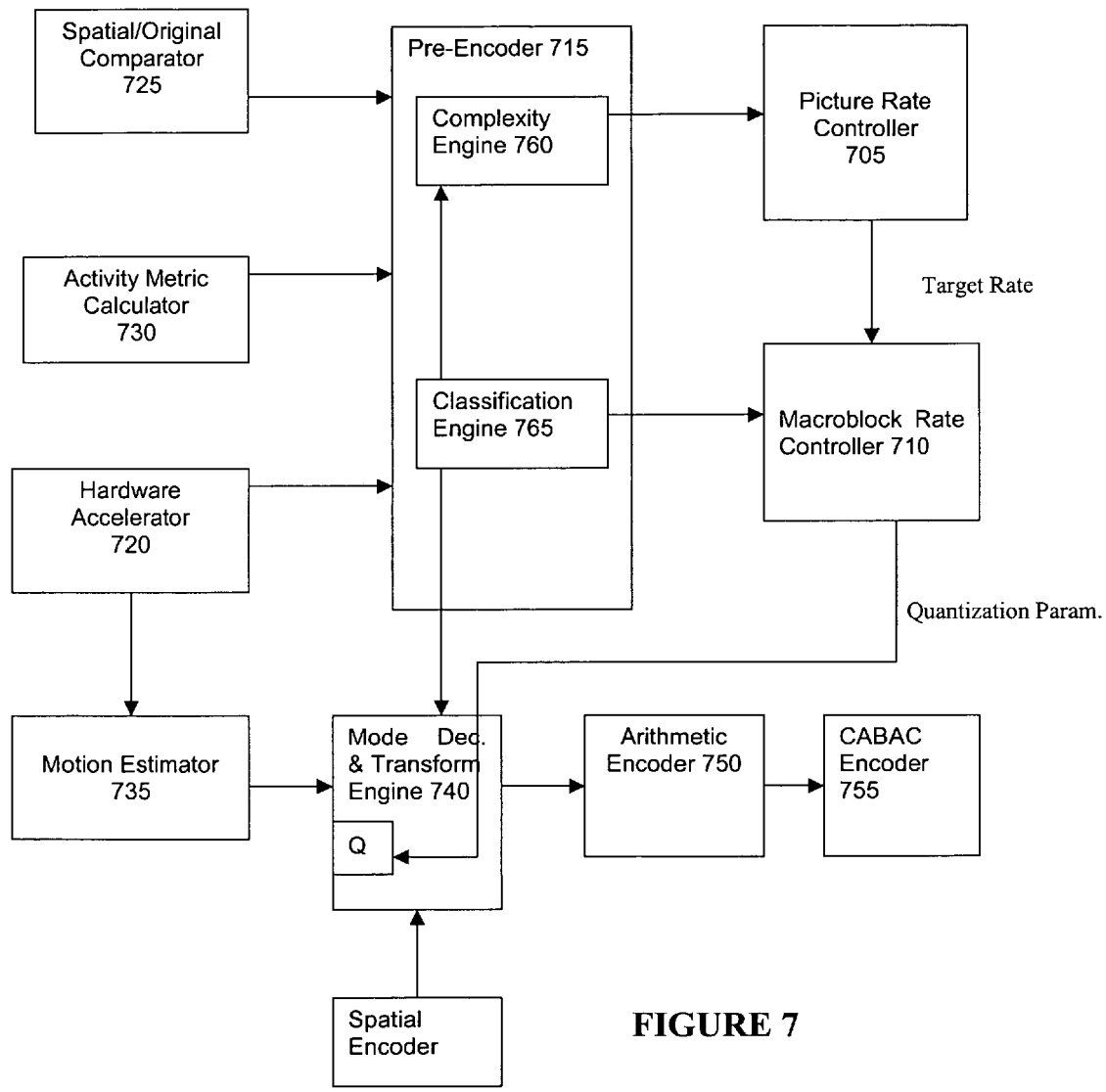
FIG. 7 is a block diagram of a system for encoding video data in accordance with an embodiment of the present invention.

Referring now to FIG. 7, there is illustrated a block diagram of an exemplary system 700 for encoding video data in accordance with an embodiment of the present invention. The system 700 comprises a picture rate controller 705, a macroblock rate controller 710, a pre-encoder 715, hardware accelerator 720, spatial from original comparator 725, an activity metric calculator 730, a motion estimator 735, a mode decision and transform engine 740, an arithmetic encoder 750, and a CABAC encoder 755.

The picture rate controller 705 can comprise software or firmware residing on the master 105. The macroblock rate controller 710, pre-encoder 715, spatial from original comparator 725, mode decision and transform engine 740, spatial predictor 745, arithmetic encoder 750, and CABAC encoder 755 can comprise software or firmware residing on each of the encoders 110(0) . . . 110($n$). The pre-encoder 715 includes a complexity engine 760 and a classification engine 765. The hardware accelerator 720 can either be a central resource accessible by each of the encoders 110, or decentralized hardware at the encoders 110.

The hardware accelerator 720 can search the original reference pictures 115ORP for candidate blocks CB that are similar to blocks 430 in the pictures 115 and compare the candidate blocks CB to the blocks 430 in the pictures. The pre-encoder 715 estimates the amount of data for encoding pictures 115.

The pre-encoder 715 comprises a complexity engine 760 that estimates the amount of data of data for encoding the pictures 115, based on the results of the hardware accelerator 720. The pre-encoder 715 also comprises a classification engine 765. The classification engine 765 classifies certain content from the pictures 115 that is perceptually sensitive, such as human faces, where additional data for encoding is desirable.

Where the classification engine 765 classifies certain content from pictures 115 to be perceptually sensitive, the classification engine 765 indicates the foregoing to the complexity engine 760. The complexity engine 760 can adjust the estimate of data for encoding the pictures 115. The complexity engine 765 provides the estimate of the amount of data for encoding the pictures by providing an amount of data for encoding the picture with a nominal quantization parameter Qp. It is noted that the nominal quantization parameter Qp is not necessarily the quantization parameter used for encoding pictures 115.

The picture rate controller 705 provides a target rate to the macroblock rate controller 710. The motion estimator 735 searches the vicinities of areas in the reconstructed reference picture that correspond to the candidate blocks CB, for reference blocks P that are similar to the blocks 430 in the plurality of pictures.

The search for the reference blocks P by the motion estimator 735 can differ from the search by the hardware accelerator 720 in a number of ways. For example, reconstructed reference picture 115RRP and the picture 115 can be full scale, whereas the hardware accelerator 720 searches the original reference picture 115ORP and the picture 115 that can be reduced scale. Additionally, the blocks 430 can be smaller partitions of the blocks by the hardware accelerator 720. For example, the hardware accelerator 720 can use a 16×16 block, while the motion estimator 735 divides the 16×16 block into smaller blocks, such as 8×8 or 4×4 blocks. Also, the motion estimator 735 can search the reconstructed reference picture 115RRP with ¼ pixel resolution.

The spatial predictor 745 performs the spatial predictions for blocks 430. The mode decision & transform engine 740 determines whether to use spatial encoding or temporal encoding, and calculates, transforms, and quantizes the prediction error E from the reference block. The complexity engine 760 indicates the complexity of each macroblock 320 at the macroblock level based on the results from the hardware accelerator 720, while the classification engine 765 indicates whether a particular macroblock contains sensitive content. Based on the foregoing, the complexity engine 760 provides an estimate of the amount of bits that would be required to encode the macroblock 320. The macroblock rate controller 710 determines a quantization parameter and provides the quantization parameter to the mode decision & transform engine 740. The mode decision & transform engine 740 comprises a quantizer Q. The quantizer Q uses the foregoing quantization parameter to quantize the transformed prediction error.

The mode decision & transform engine 740 provides the transformed and quantized prediction error E to the arithmetic encoder 750. Additionally, the arithmetic encoder 750 can provide the actual amount of bits for encoding the transformed and quantized prediction error E to the picture rate controller 705. The arithmetic encoder 750 codes the quantized prediction error E into bins. The CABAC encoder 755 converts the bins to CABAC encoded data. The actual amount of data for coding the macroblock 320 can also be provided to the picture rate controller 705.

In certain embodiments of the present invention, the picture rate controller 705 can record statistics from previous pictures, such as the target rate given and the actual amount of data encoding the pictures. The picture rate controller 705 can use the foregoing as feedback. For example, if the target rate is consistently exceeded by a particular encoder, the picture rate controller 705 can give a lower target rate.

Figure 8:
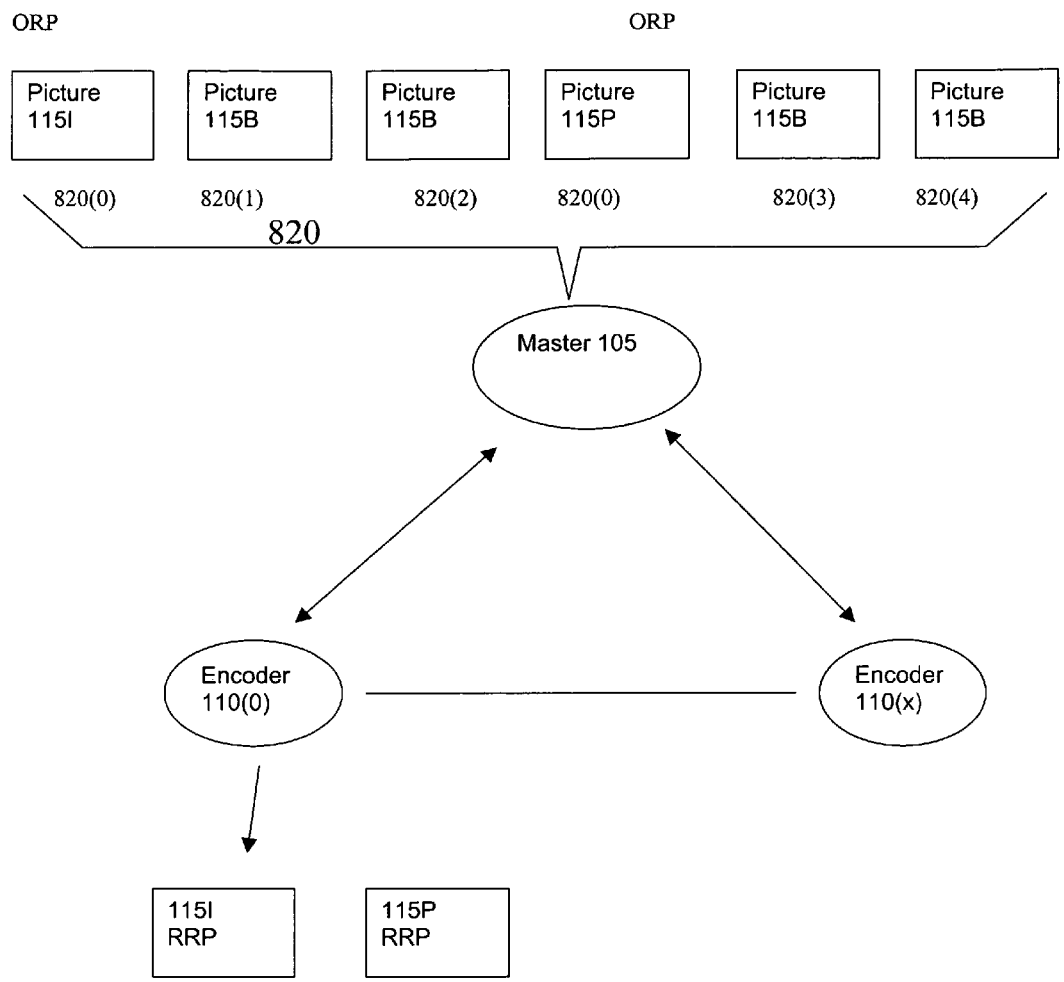
FIG. 8 is a block diagram describing an exemplary distribution of pictures in accordance with an embodiment of the present invention.

Referring now to FIG. 8, there is illustrated a block diagram of an exemplary distribution of pictures by the master 105 to the encoders 110(0) . . . 110(x). The master 105 can divide the pictures 115 into groups 820, and the groups into sub-groups 820(0) . . . 820(n). Certain pictures, intra-coded pictures 115I, are not temporally coded, certain pictures, predicted-pictures 115P, are temporally encoded from one reconstructed reference pictures 115RRP, and certain pictures, bi-directional pictures 115B, are encoded from two or more reconstructed reference pictures 115RRP. In general, intra-coded pictures 115I take the least processing power to encode, while bi-directional pictures 115B take the most processing power to encode.

In an exemplary case, the master 105 can designate that the first picture 115 of a group 820 is an intra-coded picture 115I, every third picture, thereafter, is a predicted picture 115P, and that the remaining pictures are bi-directional pictures 115B. Empirical observations have shown that bi-directional pictures 115B take about twice as much processing power as predicted pictures 115P. Accordingly, the master 105 can provide the intra-coded picture 115I, and the predicted pictures 115P to one of the encoders 110, as one sub-group 820(0), and divide the bi-directional pictures 115B among other encoders 110 as four sub-groups 820(1) . . . 820(4).

The encoders 110 can search original reference pictures 115ORP for candidate blocks that are similar to blocks in the plurality of pictures, and select the candidate blocks based on comparison between the candidate blocks and the blocks in the pictures. The encoders 110 can then search the vicinity of an area in the reconstructed reference picture 115RRP that corresponds to the area of the candidate blocks in the original reference picture 115ORP for a reference block.

The embodiments described herein may be implemented as a board level product, as a single chip, application specific integrated circuit (ASIC), or with varying levels of the decoder system integrated with other portions of the system as separate components.

The degree of integration of the decoder system may primarily be determined by the speed and cost considerations. Because of the sophisticated nature of modern processor, it is possible to utilize a commercially available processor, which may be implemented external to an ASIC implementation.

If the processor is available as an ASIC core or logic block, then the commercially available processor can be implemented as part of an ASIC device wherein certain functions can be implemented in firmware. For example, the macroblock rate controller 710, pre-encoder 715, spatial from original comparator 725, activity metric calculator 730, motion estimator 735, mode decision and transform engine 740, arithmetic encoder 750, and CABAC encoder 755 can be implemented as firmware or software under the control of a processing unit in the encoder 110. The picture rate controller 705 can be firmware or software under the control of a processing unit at the master 105. Alternatively, the foregoing can be implemented as hardware accelerator units controlled by the processor.

While the present invention has been described with reference to certain embodiments, it will be understood by those skilled in the art that various changes may be made and equivalents may be substituted without departing from the scope of the present invention.

Additionally, many modifications may be made to adapt a particular situation or material to the teachings of the present invention without departing from its scope. For example, although the invention has been described with a particular emphasis on the AVC encoding standard, the invention can be applied to a video data encoded with a wide variety of standards.

Therefore, it is intended that the present invention not be limited to the particular embodiment disclosed, but that the present invention will include all embodiments falling within the scope of the appended claims.

The invention claimed is:

1. A method for encoding video data, said method comprising:
    estimating amounts of data for encoding a plurality of pictures in parallel;
    generating a plurality of target rates corresponding to the plurality of pictures based on the estimated amounts of data for encoding the plurality of pictures, wherein at least one of the plurality of pictures is data dependent on another one of the plurality of pictures; and
    lossy compressing the plurality of pictures based on the target rates corresponding to the plurality of pictures.

2. The method of claim 1, wherein estimating amounts of data for encoding the plurality of pictures comprises:
    searching at least one original reference picture for candidate blocks that are similar to blocks in the plurality of pictures;
    selecting the candidate blocks based on comparison between the candidate blocks and the blocks in the plurality of pictures; and
    estimating the amount of data for encoding the plurality of pictures based on the comparisons.

3. The method of claim 2, wherein the original reference picture is scaled down.

4. The method of claim 2, further comprising:
    searching vicinities of areas in at least one reconstructed reference picture, said areas corresponding to the candidate blocks, for reference blocks that are similar to smaller blocks in the plurality of pictures.

5. The method of claim 1, wherein lossy compressing the plurality of pictures further comprises quantizing with at least one quantization parameter, wherein the at least one quantization parameter is a function of the target rate associated with the picture.

6. A system for encoding video data, said system comprising:
    a plurality of encoders for estimating amounts of data for encoding a corresponding plurality of pictures in parallel;
    a master for generating a plurality of target rates corresponding to the plurality of pictures based on the estimated amounts of data for encoding the plurality of pictures, wherein at least one of the plurality of pictures is data dependent on another one of the plurality of pictures; and
    wherein each of the plurality of encoders comprises a lossy compressor for lossy compressing the picture corresponding to the encoder, based on the target rate corresponding to the picture.

7. The system of claim 6, further comprising:
    a hardware accelerator for searching at least one original reference picture for candidate blocks that are similar to blocks in the plurality of pictures and comparing the candidate blocks to the blocks in the plurality of pictures; and
    wherein each of the plurality of encoders estimates the number of bits for encoding the corresponding picture, based on the comparisons between the blocks from the corresponding picture and the candidate blocks that are similar to the blocks in the corresponding picture.

8. The system of claim 7, wherein the at least one original reference picture is scaled down.

9. The system of claim 7, wherein each of the plurality of encoders further comprises:
    a motion estimator for searching vicinities of areas in at least one reconstructed picture, said areas corresponding to the candidate blocks that are similar to the blocks in the picture corresponding to the encoder, for reference blocks that are similar to the blocks in the picture corresponding to the encoder.

10. The system of claim 6, wherein each of the plurality of encoders further comprise:
    a quantizer for quantizing with at least one quantization parameter, wherein the at least one quantization parameter is a function of the target rate for the picture that corresponds to the encoder.

11. The system of claim 6, wherein the master provides the corresponding plurality of pictures to the plurality of encoders.

12. A system for encoding video data, said system comprising:
    a plurality of encoders for encoding a corresponding plurality of pictures;
    a master for distributing the corresponding plurality of pictures to the plurality of encoders; and
    a hardware accelerator for searching at least one original reference picture for candidate blocks that are similar to blocks in each of the plurality of pictures in parallel and comparing the candidate blocks to the blocks in the each of the plurality of pictures in parallel.

13. The system of claim 12, wherein the at least one original reference picture is scaled down.

14. The system of claim 12, wherein each of the plurality of encoders further comprises:
    a motion estimator for searching vicinities of areas in at least one reconstructed picture, said areas corresponding to the candidate blocks that are similar to the blocks in the picture corresponding to the encoder, for reference blocks that are similar to the blocks in the picture corresponding to the encoder.

15. The system of claim 12, wherein the reference picture is one of the plurality of pictures.

16. The system of claim 12, wherein the original reference picture is unquantized.

* * * * *